(No Model.)

M. POLLAK.
NECK OR BRACELET CHAIN.

No. 262,115. Patented Aug. 1, 1882.

Witnesses
Harold Serrell
Chas. H. Smith

Inventor
per Morris Pollak
Lemuel W. Serrell
Atty.

UNITED STATES PATENT OFFICE.

MORRIS POLLAK, OF NEW YORK, N. Y., ASSIGNOR TO LINCOLN, TIFFT & CO., OF SAME PLACE.

NECK OR BRACELET CHAIN.

SPECIFICATION forming part of Letters Patent No. 262,115, dated August 1, 1882.

Application filed June 16, 1882. (No model.)

*To all whom it may concern:*

Be it known that I, MORRIS POLLAK, of the city and State of New York, have invented an Improvement in Neck or Bracelet Chains, of which the following is a specification.

Chains have been made of numerous rings or "rollers," as they are usually termed, laid together in alternate positions with transverse wires passing through the rollers, the transverse wires being soldered at their ends to outside rings. This involves considerable expense in soldering. In other instances the transverse wires have been in the form of staples passed across the chain, and the ends twisted together and received into hollow cylindrical links.

My invention is made for lessening the cost of construction, for avoiding the soldering, and for allowing the chain to be taken apart or put together with facility.

Figure 1:
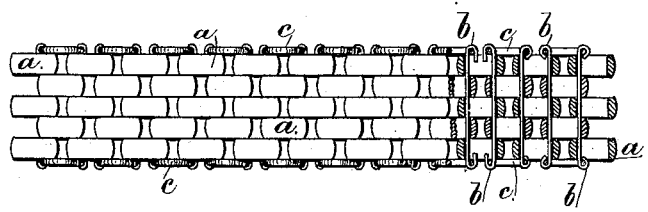
Figure 2:
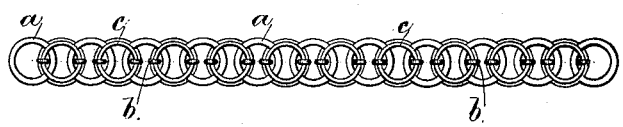
Figure 3:
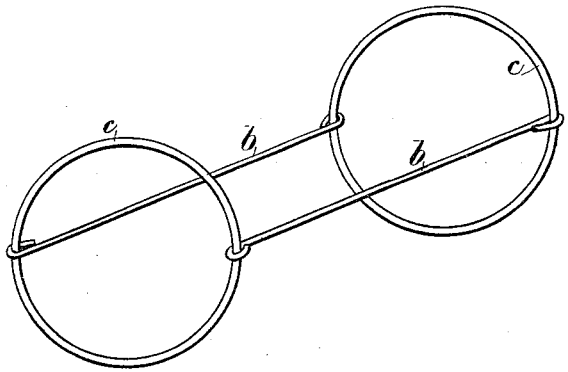

In the drawings, Figure 1 is a view of the chain with part in section, and Fig. 2 is an edgewise view. Fig. 3 is a perspective view of the wires and ring united.

The links or rollers $a$ $a$ are of the ordinary character. Usually they are circular; but they may be elliptical or of any other suitable form. I have represented the parts in a magnified size for greater clearness.

$b$ $b$ are the transverse wires, passing through the rollers or links at one edge or end of one and through the next roller at the other edge or end. Thus the rollers or links alternate and are connected to form a flat chain of any desired length and width. These parts thus far are well known; but the transverse wires, instead of being soldered to the edge links or rollers or twisted together, are passed through the edge links or rings, $c$ $c$, and turned over outwardly to form eyes, so that each transverse wire has an eye at each end around the edge rings; and there are two of these transverse wires and two of the rings $c$, united together, as seen in the separate perspective view, Fig. 3. This manner of connecting the ends of the transverse wires gives a flexibility to the chain that is superior to that of the chains heretofore made, and the chain is equally strong, the expense of soldering is avoided, and the chain can be taken apart or repaired more easily than heretofore. Where the ends of the wires $b$ are bent into an open eye or hook, they will hold respective edge rings or links, $c$, securely, because the edges of the rollers or links touch each other and the chain cannot be compressed widthwise. Hence the links $c$ cannot be unhooked from the transverse wires.

I am aware that strips of metal have been passed through the rollers or links, and that in some instances heads have been made on these strips, and in other instances washer-plates have been formed with the metal strips. These render the chain more rigid than mine, and the edges of the chain are not alike.

I claim as my invention—

In a neck or bracelet chain, the links or rollers $a$ and the transverse wires that connect the links, each transverse wire being bent at both ends to form an eye or hook, in combination with the edge links, $c$, that are received into said eyes or hooks, substantially as set forth.

Signed by me this 9th day of June, A. D. 1882.

MORRIS POLLAK.

Witnesses:
 GEO. T. PINCKNEY,
 WILLIAM G. MOTT.